(12) United States Patent
Lee et al.

(10) Patent No.: US 7,745,053 B2
(45) Date of Patent: Jun. 29, 2010

(54) LITHIUM SECONDARY BATTERY HAVING AN IMPROVED POLYMER ELECTROLYTE

(75) Inventors: Yong-Beom Lee, Suwon-si (KR); Kwang-Jo Cheong, Suwon-si (KR); Eui-Hwan Song, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1107 days.

(21) Appl. No.: 11/406,773

(22) Filed: Apr. 18, 2006

(65) Prior Publication Data

US 2006/0240326 A1 Oct. 26, 2006

(30) Foreign Application Priority Data

Apr. 21, 2005 (KR) .................. 10-2005-0033084

(51) Int. Cl.
*H01M 6/18* (2006.01)
(52) U.S. Cl. .................. 429/306; 429/307; 429/317; 429/309
(58) Field of Classification Search .................. 429/306, 429/307, 317, 309, 188
See application file for complete search history.

(56) References Cited

U.S. PATENT DOCUMENTS

| 5,718,989 | A | 2/1998 | Aoki et al. |
| 7,241,534 | B2 | 7/2007 | Nishimura et al. |

FOREIGN PATENT DOCUMENTS

| EP | 1 347 462 A1 | 9/2003 |
| EP | 1 508 934 A1 | 2/2005 |
| EP | 1508934 | * 2/2005 |
| EP | 1 524 709 A2 | 4/2005 |
| JP | 9-237631 | 9/1997 |
| JP | 11-265616 | 9/1999 |
| JP | 2000-311516 | 11/2000 |
| JP | 2003-068138 | 3/2003 |
| JP | 2003-147218 | 5/2003 |
| JP | 2003-217340 | 7/2003 |
| JP | 2003-249264 | 9/2003 |
| JP | 2005-038722 | 2/2005 |
| JP | 2005-072003 | 3/2005 |
| KR | 2003-0087080 | 11/2003 |
| KR | 10-2005-0014408 | 2/2005 |

OTHER PUBLICATIONS

Patent Abstracts of Japan for Publication No. 09-237631; dated Sep. 9, 1997 in the name of Taku Aoki, et al.
Patent Abstracts of Japan for Publication No. 2003-249264; dated Sep. 5, 2003 in the name of Cheol-Soo Jung, et al.
European Search Report dated Jun. 21, 2006 for EP 06112896.3, in the name of Samsung SDI Co., Ltd.
Korean Patent Abstracts, Publication No. 1020050014408 A, dated Feb. 7, 2005, in the name of Jun Won Kang et al.
Japanese Office action dated Sep. 29, 2009, for corresponding Japanese application 2006-105448, noting listed references in this IDS, as well as JP 2003-249264 previously filed in an IDS dated Apr. 12, 2007.

* cited by examiner

*Primary Examiner*—Raymond Alejandro
(74) *Attorney, Agent, or Firm*—Christie, Parker & Hale, LLP

(57) ABSTRACT

Lithium secondary batteries having polymer electrolytes are provided. A lithium battery includes a positive electrode including a positive active material capable of intercalating and deintercalating lithium ions, a negative electrode including a negative active material capable of intercalating and deintercalating lithium ions, and a polymer electrolyte. The polymer electrolyte includes a polymer, a non-aqueous organic solvent, and a lithium salt. The polymer electrolyte has a shear strength relative to the positive electrode of about 0.7 N/mm or greater.

34 Claims, 1 Drawing Sheet

LITHIUM SECONDARY BATTERY HAVING AN IMPROVED POLYMER ELECTROLYTE

CROSS REFERENCE TO RELATED APPLICATION

This application claims priority to and the benefit of Korean Patent Application No. 10-2005-0033084 filed in the Korean Intellectual Property Office on Apr. 21, 2005, the entire content of which is incorporated herein by reference.

FIELD OF THE INVENTION

The present invention relates to lithium secondary batteries. More particularly, the invention relates to a lithium secondary battery having an electrolyte which endures external physical impact and maintains mechanical strength after storage at high temperature.

BACKGROUND OF THE INVENTION

Recently, reductions in the size and weight of portable electronic equipment have led to the development of batteries for use in such equipment. Batteries having high energy density are used as the power sources for this portable equipment, and lithium secondary batteries have been actively researched.

In a lithium secondary battery cell, lithium-transition metal oxides are used as the positive active material and crystalline or amorphous carbon or carbon complexes are used as the negative active material. Positive and negative electrodes are formed by coating the appropriate active material slurry or applying the appropriate active material film onto current collectors to a desired thickness and length. An electrode assembly is fabricated by positioned a insulative separator between the positive and negative electrodes and spiral-winding or laminating the electrodes and the separator. The lithium secondary battery cell is fabricated by inserting the electrode assembly into a battery case, such as a metal can or metal laminated pouch, and injecting an electrolyte solution in the battery case.

Battery pouches afford the batteries shape freedom and increased battery capacity relative to cans. However, pouches are easily modified and damaged by external physical impact and swell during storage at high temperature. These problems are more serious in lithium secondary batteries using liquid electrolyte solutions than they are in lithium secondary batteries using polymer electrolyte solutions. Therefore, batteries using pouches generally use polymer electrolyte solutions.

Polymer electrolyte lithium secondary batteries have advantages such as leak prevention, safety, high temperature stability, durability against external physical impact and the like. Much research has been conducted into improving the stability of such batteries against external physical impact and reducing the deterioration of physical strength during high temperature storage.

SUMMARY OF THE INVENTION

In one embodiment of the present invention, a lithium secondary battery includes an electrolyte that is durable against external physical impact and that maintains physical strength during high temperature storage. The lithium secondary battery includes a positive electrode having a positive electrode active material capable of intercalating and deintercalating lithium ions, a negative electrode having a negative electrode active material capable of intercalating and deintercalating lithium ions, and a polymer electrolyte comprising a polymer, a non-aqueous organic solvent, and a lithium salt. The polymer electrolyte has a shear strength relative to the positive electrode of about 0.7N/mm or greater. Further, the polymer electrolyte has a peel strength relative to the positive electrode of about 0.002N/mm or greater.

BRIEF DESCRIPTION OF THE DRAWING

The above and other features and advantages of the present invention will become more apparent by reference to the following detailed description when considered in conjunction with the accompanying drawings wherein.

DETAILED DESCRIPTION OF THE INVENTION

Figure 1:
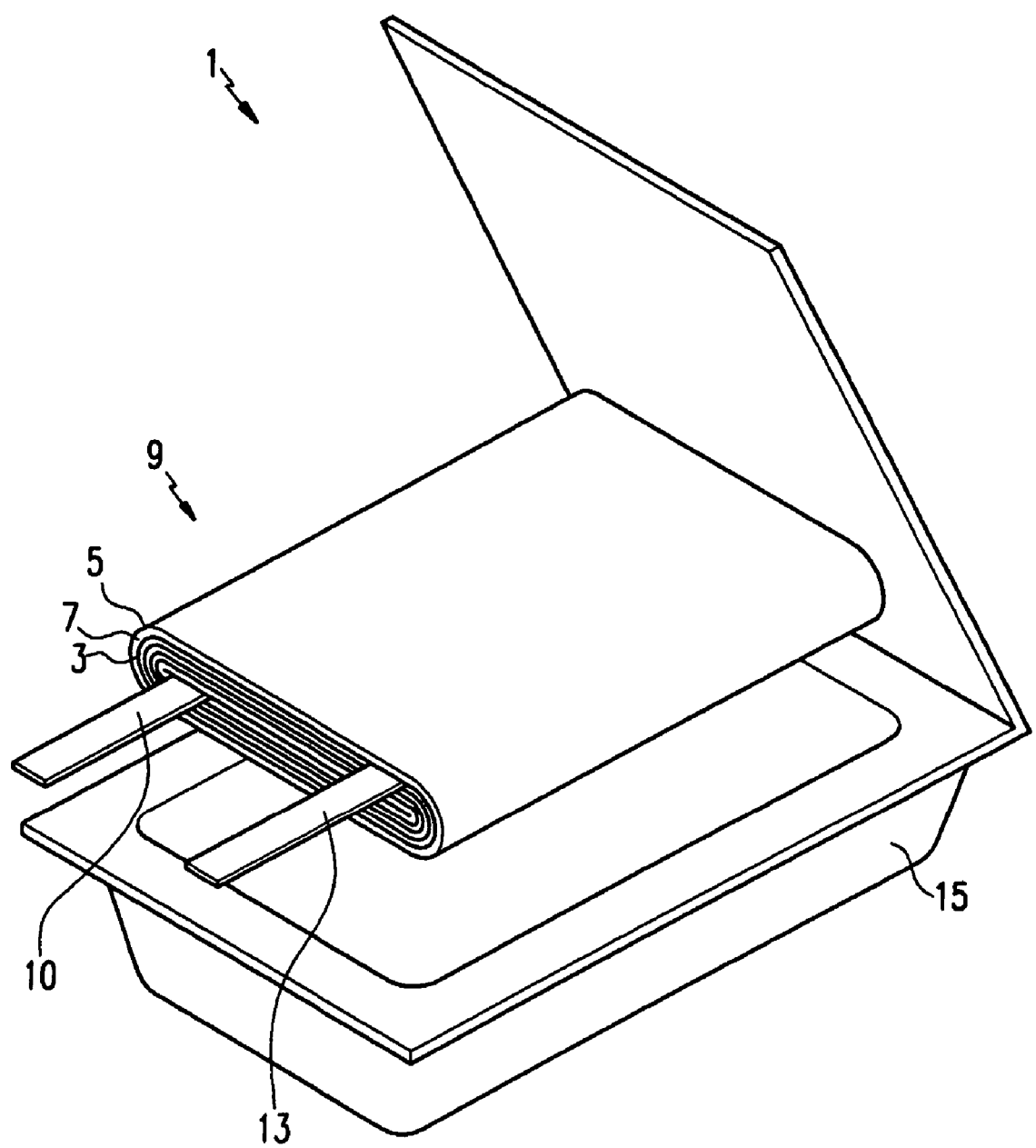
FIG. 1 is a schematic perspective view of a lithium secondary battery according to one embodiment of the present invention.

In one embodiment of the present invention, a lithium secondary battery includes a metal laminated pouch as the battery case. The pouch affords the battery shape freedom and increased battery capacity relative to a metal can, but has less mechanical strength than the can. The lithium secondary battery includes a polymer electrolyte that preserves battery performance, prevents leaking, and improves mechanical properties, safety, and storage characteristics at high temperature.

The lithium secondary battery includes a positive electrode having a positive active material capable of intercalating and deintercalating lithium ions, a negative electrode having a negative active material capable of intercalating and deintercalating lithium ions, and a polymer electrolyte. In one embodiment, the polymer electrolyte has a shear strength relative to the positive electrode of about 0.7N/mm or greater. In another embodiment, the polymer electrolyte has a shear strength ranging from about 0.7 to about 1.5 N/mm. In yet another embodiment, the polymer electrolyte has a shear strength ranging from about 1.0 to about 1.5 N/mm. In still another embodiment, the polymer electrolyte has a shear strength ranging from about 1.2 to about 1.5 N/mm.

According to another embodiment of the present invention, the polymer electrolyte has a shear strength relative to the positive electrode of about 0.7N/mm or greater and a peel strength relative to the positive electrode of about 0.002N/mm or greater. In another embodiment, the polymer electrolyte has a shear strength relative to the positive electrode ranging from about 0.7 to about 1.5 N/mm and a peel strength relative to the positive electrode of about 0.006 to about 0.07N/mm. In yet another embodiment, the polymer electrolyte has a shear strength relative to the positive electrode ranging from about 1.0 to about 1.5 N/mm and a peel strength relative to the positive electrode of about 0.015 to about 0.07N/mm. In still another embodiment, the polymer electrolyte has a shear strength relative to the positive electrode ranging from about 1.2 to about 1.5 N/mm and a peel strength relative to the positive electrode ranging from about 0.035 to about 0.07N/mm.

When the shear strength is less than about 0.7N/mm, or when the shear strength and peel strength are outside the above-described ranges, the mechanical strength of the battery and battery performance are deteriorated.

The shear strength and peel strength of the electrolyte depend on the polymer used in the electrolyte. According to one embodiment of the present invention, the polymer electrolyte includes a polymer having a first monomer represented by the following Formula 1. In another embodiment, the polymer electrolyte includes a first monomer represented by Formula 1 and a second monomer represented by one of Formulas 2 through 7. The polymer electrolyte is prepared by polymerizing the monomers making up the electrolyte.

$$\text{A-polyesterpolyol-B} \tag{1}$$

In Formula 1, the polyesterpolyol is produced by a condensation reaction of at least one alcohol derivative having 2 to 6 OH groups and at least one dicarboxylic acid derivative. The polyesterpolyol has a weight average molecular weight ranging from about 100 to about 10,000,000. A and B are linked to the terminal OH groups of the polyesterpolyol and can be the same or different. A and B are each selected from the group consisting of $CH_2=CR-C(=O)-$, $CH_2=CR-C-CH_2-$, $CH_2=CR-$, $CH_2=CR-O-C(=O)-$, $CH_2=CH-CH_2-O-$, $CH_2=CH-S(=O)_2-$, or $CH_2=CR-C(=O)-O-CH_2CH_2NH-C(O)-$, where R is a $C_1$ to $C_{10}$ hydrocarbon or a $C_6$ to $C_{10}$ aromatic hydrocarbon.

$$CH_2=CR1-C(=O)-O-X \tag{2}$$

$$CH_2=CR1-O-X \tag{3}$$

$$CH_2=CR1-O-C(=O)-X \tag{4}$$

$$CH_2=CH-CH_2-O-X \tag{5}$$

$$CH_2=CH-S(=O)_2-X \tag{6}$$

$$CH_2=CR1-C(=O)-O-CH_2CH_2-NH-C(=O)-O-X \tag{7}$$

In Formulas 2 through 7, R1 is selected from the group consisting of H, $C_1$ to $C_{10}$ hydrocarbons and $C_6$ to $C_{10}$ aromatic hydrocarbons, and X is selected from the group consisting of $C_1$ to $C_{20}$ hydrocarbons, $C_6$ to $C_{20}$ halogenated hydrocarbons, $C_6$ to $C_{20}$ aromatic hydrocarbons and $C_6$ to $C_{20}$ halogenated aromatic hydrocarbons. In one embodiment, the second monomer is selected from the group consisting of compounds represented by Formulas 3, 6 and 7.

In compounds represented by Formula 1, nonlimiting examples of alcohol derivatives which produce polyesterpolyol include polyethylene glycol, polypropylene glycol, alkanediol, ethoxylated alkanediol, propoxylated alkanediol, trimethylolpropane, ethoxylated trimethylolpropane, propoxylated trimethylolpropane, ditrimethylolpropane, ethoxylated ditrimethylolpropane, propoxylated ditrimethylolpropane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A, and propoxylated bisphenol A.

One example of polyesterpolyol is represented by the following Formula 8.

In Formula 1, A and B can be the same or different and each is selected from the group consisting of (meth)acryl groups, vinyl groups, allyl groups, vinylsulfonyl groups, urethane (meth)acryl groups and combinations thereof. In one embodiment, each of A and B is selected from the group consisting of (meth)acryl groups, vinyl groups, vinylsulfonyl groups, urethane(meth)acryl groups and combinations thereof.

In one embodiment of the present invention, the monomer in the polymer electrolyte is present in an amount ranging from about 1 to about 30 wt %. In another embodiment, the monomer is present in an amount ranging from about 3 to about 25 wt %. When the monomer is present in an amount less than about 1 wt %, battery strength deteriorates. When the monomer is present in an amount greater than about 30 wt %, battery performance deteriorates.

When first and second monomers are used, they are used in a weight ratio ranging from about 1:1 to about 1:60. In one embodiment, the weight ratio of the first and second monomers ranges from about 1:5 to about 1:40. When the weight ratio is outside these ranges, battery strength and performance deteriorate.

To initiate polymerization of the monomers, a polymerization initiator is used. The polymerization initiator may be any material capable of easily initiating polymerization of the monomers and which does not deteriorate battery performance. Nonlimiting examples of suitable polymerization initiators include organic peroxides and azo-based compounds.

Organic peroxides for use as the polymerization initiator can include peroxy dicarbonates, diacyl peroxides and peroxy esters. Nonlimiting examples of suitable peroxy esters include di(4-t-butylcyclohexyl) peroxydicarbonate, di-2-ethylhexyl peroxy dicarbonate, di-isopropyl peroxy dicarbonate, di-3-methoxy butyl peroxy dicarbonate, t-butyl peroxy isopropyl carbonate, t-butyl peroxy 2-ethylhexyl carbonate, 1,6-bis(t-butyl peroxycarbonyloxy)hexane, diethylene glycol-bis (t-butyl peroxy carbonate) and the like. Nonlimiting examples of suitable diacyl peroxides include diacetyl peroxide, dibenzoyl peroxide, dilauroyl peroxide, and bis-3,5,5-trimethyl hexanoyl peroxide. Nonlimiting examples of suitable peroxy esters include perhexyl pivalate, t-butyl peroxypivalate, t-amyl peroxypivalate, t-butyl peroxy-2-ethyl-hexanoate, t-hexylperoxy pivalate, t-butyl peroxy neodecanoate, t-butyl peroxy neoheptanoate, t-hexylperoxy pivalate, 1,1,3,3-tetramethylbutyl peroxy neodecanoate, 1,1,3,3-tetramethyl butyl peroxy 2-ethylhexanoate, t-amyl peroxy 2-ethyl hexanoate, t-butyl peroxy isobutyrate, t-amylperoxy 3,5,5-trimethyl hexanoate, t-butyl peroxy 3,5,5-trimethyl hexanoate, t-butyl peroxy acetate, t-butyl peroxy benzoate, di-butylperoxy trimethyl adipate, and the like.

Nonlimiting examples of suitable azo-based compounds for use as the polymerization initiator include 2,2'-azo-bis

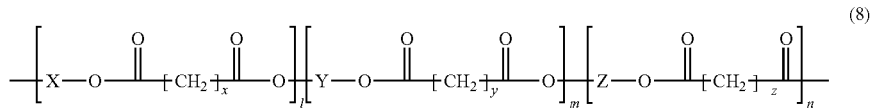

(8)

In Formula 8, X, Y, and Z can be the same or different, and are repeating units which can be divalent (or higher valence) alkylene oxides, alkylene imines or repeating units thereof. X, Y and Z can also be an alkylene group. In the Formula, each of x, y, and z is an integer ranging from 1 to 20, and each of l, m, and n is 0 or 1 or greater and is controlled based on the molecular weight of the target polymer.

(isobutyronitrile), 2,2'-azo-bis(2,4-dimethylvaleronitrile), and 1,1'-azo-bis(cyanocyclohexane).

The polymerization initiator is used in an amount sufficient to initiate polymerization of the monomers. In one embodiment, the polymerization initiator is used in an amount ranging from about 0.01 to about 5 wt % based on the total weight of the monomers.

The polymer electrolyte composition further includes a non-aqueous organic solvent and a lithium salt, both of which are generally provided in a liquid electrolyte solution. The lithium salt acts as a source of lithium ions in the battery, enabling the basic operation of the lithium battery. Nonlimiting examples of suitable lithium salts include $LiPF_6$, $LiBF_4$, lithium bis(oxalato) borate (LiBOB), $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2y+1}SO_2)$ (where, x and y are natural numbers), $LiSO_3CF_3$ and mixtures thereof.

In one embodiment, the concentration of the lithium salt ranges from about 0.6 to about 2.0M. In another embodiment, the concentration of the lithium salt ranges from about 0.7 to about 1.6M. When the concentration of the lithium salt is less than about 0.6M, electrolyte conductivity and performance decrease. When the concentration of the lithium salt is greater than about 2.0M, the viscosity of the electrolyte increases and the mobility of lithium ions decreases.

Nonlimiting examples of suitable non-aqueous organic solvents include carbonates, esters, ethers, ketones, nitriles and mixtures thereof. The carbonates can include dimethyl carbonate, ethyl methyl carbonate, diethyl carbonate, dipropyl carbonate, dibutyl carbonate, ethylene carbonate, propylene carbonate, butylene carbonate and the like. The esters can include methyl acetate, ethyl acetate, methyl hexanoate, methyl formate and the like. The ketones can include γ-butyrolactone, γ-valerolactone, γ-caprolactone, δ-valerolactone, ε-caprolactone and the like. The nitrites can include acetonitrile and the like.

When a carbonate-based solvent is used as the non-aqueous organic solvent, a mixture of cyclic and linear carbonates can be used in a volume ratio ranging from about 1:1 to about 1:9. When cyclic and linear carbonates are used within this volume ratio range, electrolyte performance improves.

The non-aqueous organic solvent can further include an aromatic hydrocarbon-based organic solvent. In one embodiment, the aromatic hydrocarbon-based organic solvent is represented by the following Formula 9.

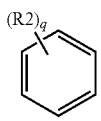

(9)

In Formula 9, R2 is selected from the group consisting of halogens, $C_1$ to $C_{10}$ alkyls and combinations thereof, and q is an integer ranging from 0 to 6.

Nonlimiting examples of suitable aromatic hydrocarbon-based compounds include benzene, fluorobenzene, toluene, fluorotoluene, trifluorotoluene, and xylene.

According to another embodiment of the present invention, the polymer electrolyte composition further includes an additive. The additive can be a carbonate additive having a substituent selected from the group consisting of halogens, cyano (CN) groups, nitro ($NO_2$) groups, vinylene carbonate, divinylsulfone, and ethylene sulfite. The additive inhibits swelling at high temperatures, and improves electrochemical properties such as capacity, cycle-life, low temperature characteristics, and the like. The carbonate additive can comprise an ethylene carbonate derivative represented by the following Formula 10. In one embodiment fluoroethylene carbonate

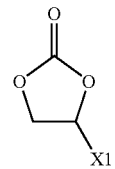

(10)

In Formula 10, X1 is selected from the group consisting of halogens, cyano (CN) groups, and nitro ($NO_2$) groups.

The carbonate additive is present in an amount ranging from about 0.01 to about 10 parts by weight based on 100 parts by weight of the polymer electrolyte composition. In one embodiment, the additive is present in an amount ranging from about 0.01 to about 5 parts by weight based on 100 parts by weight of the polymer electrolyte composition. When the carbonate additive is present in an amount less than about 0.01 parts by weight, inhibition of gas generation inside the battery is difficult. When the additive is present in an amount greater than about 10 parts by weight, the cycle-life of the battery at high temperature deteriorates and the battery swells at high temperature.

A lithium secondary battery according to one embodiment of the present invention is fabricated by first forming an electrode assembly by winding a positive electrode, a negative electrode and a separator. The electrode assembly is inserted into a battery case, and the polymer electrolyte composition is injected into the case. After injecting the case with the electrolyte composition, the composition is cured. The process by which the composition is cured is well-known in the art. During curing, the polymerization of the monomers of the polymer electrolyte composition is initiated by a polymerization initiator. After curing, the resulting battery has a polymer-type electrolyte. The battery case may be a metal can or a metal-laminated pouch. However, the effects of the polymer electrolyte composition are improved when it is injected into a pouch type battery case.

The positive electrode includes a positive active material capable of intercalating and deintercalating lithium ions. Such a positive active material can include lithiated intercalation compounds selected from the group consisting of compounds represented by the following Formulas 11 through 22.

$$Li_xMn_{1-y}M_yC_2 \tag{11}$$

$$Li_xMn_{1-y}M_yO_{2-z}D_z \tag{12}$$

$$Li_xMn_2O_{4-z}D_z \tag{13}$$

$$Li_xCo_{1-y}M_yC_2 \tag{14}$$

$$Li_xCo_{1-y}M_yO_{2-z}D_z \tag{15}$$

$$Li_xNi_{1-y}M_yC_2 \tag{16}$$

$$Li_xNi_{1-y}M_yO_{2-z}C_z \tag{17}$$

$$Li_xNi_{1-y}Co_yO_{2-z}D_z \tag{18}$$

$$Li_xNi_{1-y-z}Co_yM_zC_\alpha \tag{19}$$

$$Li_xNi_{1-y-z}Co_yM_zO_{2-\alpha}D_\alpha \tag{20}$$

$$Li_xNi_{1-y-z}Mn_yM_zC_\alpha \tag{21}$$

$$Li_xNi_{1-y-z}Mn_yM_zO_{2-\alpha}D_\alpha \tag{22}$$

In Formulas 11 through 22, $0.90 \leq x \leq 1.1$, $0 \leq y \leq 0.5$, $0 \leq z \leq 0.5$, $0 \leq \alpha \leq 2$, M is selected from the group consisting of Al, Ni, Co, Mn, Cr, Fe, Mg, Sr, V, rare earth elements and mixtures thereof, C is selected from the group consisting of O, F, S and P, and D is selected from the group consisting of F, S and P.

The negative electrode includes a negative active material capable of intercalating and deintercalating lithium ions. Nonlimiting examples of suitable negative active materials include carbon-based negative active materials such as crystalline or amorphous carbon and carbon complexes.

The positive and negative electrodes are fabricated by first preparing active material compositions by mixing the active material, a conductive agent, and a binder in a solvent to form a slurry. The slurry is then coated on a current collector as is well known in the art.

The conductive agent may comprise any material which does not induce chemical modification and which is electrically conductive. Nonlimiting examples of suitable conductive agents include carbon black, acetylene black, ketjen black, carbon fibers, metal powders and metal fibers including metals such as copper, nickel, aluminum, silver, and the like.

The binder may include any material capable of firmly attaching the active materials and conductive agents to the current collector. Nonlimiting examples of suitable binders include polyvinylalcohol, carboxylmethylcellulose, hydroxypropylenecellulose, diacetylenecellulose, polyvinylchloride, polyvinylpyrrolidone, polytetrafluoroethylene, polyvinylidene fluoride, polyethylene, polypropylene and the like.

The solvent can include any solvent capable of dispersing the active material, conductive agent and binder. One nonlimiting example of the solvent is N-methylpyrrolidone.

One embodiment of a non-aqueous electrolyte secondary battery according to the present invention is illustrated in FIG. 1. The battery is a pouch-type lithium ion battery 1 fabricated by inserting an electrode assembly 9 into a battery case 15. The electrode assembly 9 includes a negative electrode 3, a positive electrode 5, and a separator 7 positioned between the positive and negative electrodes. An electrolyte solution is injected into the battery case 15 and impregnates the electrode assembly 9. Conductive leads 10 and 13 collect the current generated when the battery is operated, and are attached to the positive and negative electrodes, respectively. The conductive leads 10 and 13 carry the current the positive and negative electrodes to the positive and negative terminals. Although illustrated as having a generally square or rectangular shape, it is understood that the lithium secondary battery can have any shape.

The following examples illustrate certain exemplary embodiment of the present invention. However, these examples are presented for illustrative purposes only and the present invention is not limited by these examples.

Synthesis Example of Monomer 1

0.02 mol of polyesterpolyol (DR1515 having a Mn=1500 available from DAERYUNG Enterprise Co. Ltd.) was prepared by condensation of ethylene glycol (EG), diethylene glycol (DEG), trimethylolpropane (TMP), and adipic acid. The 0.02 mol of polyesterpolyol, 30 g of methylene chloride as a reaction solvent, and 0.04 mol of triethylamine as a catalyst were placed in a cooling bath and agitated to obtain a first mixed solution. A second mixed solution of 0.04 mol of acryloyl chloride and 15 g methylene chloride was added to the first mixed solution in a dropwise fashion to obtain a third mixed solution. The third mixed solution was heated to 40° C. and agitated for 6 hours to deposit salt. The deposited salt was filtered off and methylene chloride was removed by distillation to prepare a target monomer SP1 having a weight average molecular weight of about 25,000 and which is represented by the following Formula 23.

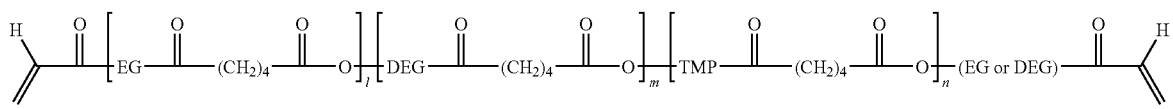

(23)

In Formula 23, each of l, m, and n is 0, 1 or greater, and is controlled so that the weight average molecular weight of the monomer is about 25,000.

Synthesis Example of Monomer 2

A first mixed solution of 0.04 mol of isocyanatoethyl methacrylate and 15 g of methylene chloride was added in a dropwise fashion to a second mixed solution of 0.02 mol of the polyesterpolyol used in Synthesis Example 1, 30 g of methylene chloride as a reaction solvent, and 0.0002 mol of dibutyltin dilaurate. The resulting solution was agitated for 6 hours at room temperature and the agitated again for 2 hours at 50° C. to deposit salt. The deposited salt was filtered off and methylene chloride was removed by distillation to prepare a target monomer SP2 having a weight average molecular weight of about 25,000 and which is represented by the following Formula 24.

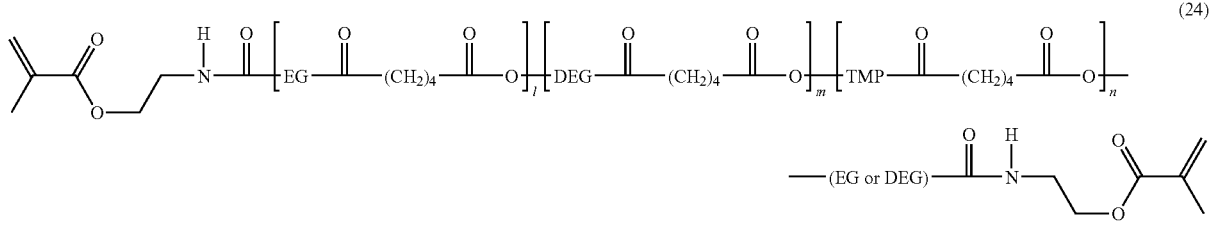

(24)

In Formula 24, each of l, m, and n is 0, 1 or greater, and is controlled so that the weight average molecular weight of the monomer is about 25,000.

Synthesis Example of Monomer 3

A monomer SP3 having a weight average molecular weight of about 25,000 and which is represented by the following Formula 25 was prepared as in Synthesis Example 1, except that the polyesterpolyol was prepared by condensation of diethylene glycol and adipic acid.

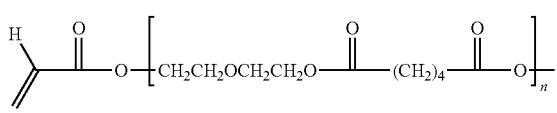 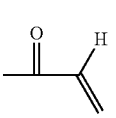

(25)

In Formula 25, n is 0, 1 or greater, and is controlled so that the weight average molecular weight of the monomer is about 25,000.

Example 1

7 wt % of the SP1 monomer prepared as in Synthesis Example 1 and 93 wt % of an electrolyte solution comprising 1.3M LiPF$_6$ dissolved in an ethylene carbonate:ethyl methyl carbonate:propylene carbonate:fluorobenzene (30:55:5:15 wt %) mixed solvent were mixed to form a mixed solution. A polymer electrolyte composition was prepared by adding perhexyl pivalate as a polymerization initiator in an amount of 2 wt % based on the weight of the monomers.

A lithium battery cell was fabricated by winding the positive electrode, negative electrode and separator to form an electrode assembly and placing the electrode assembly into a battery case. 2.7 g of the polymer electrolyte composition was injected into the battery case, and the battery case was allowed to stand for 16 hours. The resulting battery case was sealed under vacuum and heat-treated in a 70° C. oven for 2 hours and 30 minutes to form a lithium secondary battery cell.

The positive electrode was fabricated using a LiCoO$_2$ positive active material, ketjen black as a conductive material, and a polyvinylidene fluoride binder in a weight ratio of 96:2:2. The negative electrode was fabricated using artificial graphite as a negative active material and a polyvinylidene fluoride binder in a weight ratio of 94:6.

Example 2

A lithium battery cell was fabricated as in Example 1, except that 5 wt % of the SP1 monomer prepared as in Synthesis Example 1 and 95 wt % of the electrolyte solution were used.

Example 3

A lithium battery cell was fabricated as in Example 1, except that 3 wt % of the SP1 monomer prepared as in Synthesis Example 1 and 97 wt % of the electrolyte solution were used.

Example 4

A lithium battery cell was fabricated as in Example 1, except that 10 wt % of the SP1 monomer prepared as in Synthesis Example 1 and 90 wt % of the electrolyte solution were used.

Example 5

A lithium battery cell was fabricated as in Example 1, except that 20 wt % of the SP1 monomer prepared as in Synthesis Example 1 and 80 wt % of the electrolyte solution were used.

Example 6

A lithium battery cell was fabricated as in Example 1, except that 30 wt % of the SP1 monomer prepared as in Synthesis Example 1 and 70 wt % of the electrolyte solution were used.

Example 7

A lithium battery cell was fabricated as in Example 1, except that 7 wt % of the SP1 monomer prepared as in Synthesis Example 1, 90 wt % of the electrolyte solution, and 3 wt % of a fluoroethylene carbonate additive were used.

Example 8

A lithium battery cell was fabricated as in Example 1, except that 9 wt % of the SP1 monomer prepared as in Synthesis Example 1 as a first monomer, 1 wt % of hexylacrylate (HA) as a second monomer, 87 wt % of the electrolyte solution, and 3 wt % of a fluoroethylene carbonate additive were used.

Example 9

A lithium battery cell was fabricated as in Example 1, except that 6 wt % of the SP1 monomer prepared as in Synthesis Example 1 as a first monomer, 4 wt % of HA as a second monomer, 87 wt % of the electrolyte solution, and 3 wt % of a fluoroethylene carbonate additive were used.

Example 10

A lithium battery cell was fabricated as in Example 1, except that 6 wt % of the SP1 monomer prepared as in Synthesis Example 1 as a first monomer, and 1 wt % of HA as a second monomer were used.

Example 11

A lithium battery cell was fabricated as in Example 1, except that 5 wt % of the SP1 monomer prepared as in Synthesis Example 1 as a first monomer, and 2 wt % of HA as a second monomer were used.

Example 12

A lithium battery cell was fabricated as in Example 1, except that 4 wt % of the SP1 monomer prepared in Synthesis Example 1 as a first monomer, and 3 wt % of HA as a second monomer were used.

Example 13

A lithium battery cell was fabricated as in Example 1, except that 3 wt % of the SP1 monomer prepared as in Synthesis Example 1 as a first monomer, and 4 wt % of HA as a second monomer were used.

Example 14

A lithium battery cell was fabricated as in Example 1, except that 5 wt % of the SP1 monomer prepared as in Synthesis Example 1 as a first monomer, and 2 wt % of butylacrylate as a second monomer were used.

Example 15

A lithium battery cell was fabricated as in Example 1, except that 5 wt % of SP1 monomer prepared as in Synthesis Example 1 as a first monomer, and 2 wt % of isodecylacrylate as a second monomer were used.

Example 16

A lithium battery cell was fabricated as in Example 1, except that 5 wt % of the SP1 monomer prepared as in Synthesis Example 1 as a first monomer, and 2 wt % of ethylene glycol methylether acrylate as a second monomer were used.

Example 17

A lithium battery cell was fabricated as in Example 1, except that 5 wt % of the SP2 monomer prepared as in Synthesis Example 2 as a first monomer, 2 wt % of HA as a second monomer, and 3 wt % of fluoroethylene carbonate as an additive were used.

Example 18

A lithium battery cell was fabricated as in Example 1, except that 5 wt % of the SP3 monomer prepared as in Synthesis Example 3 as a first monomer, 2 wt % of HA as a second monomer, and 3 wt % of fluoroethylene carbonate as an additive were used.

COMPARATIVE EXAMPLE 1

A lithium battery cell was fabricated as in Example 1, except that a polypropylene glycol diacrylate monomer was used.

The lithium battery cells according to Examples 1 through 18 and Comparative Example 1 were evaluated by the following methods.

1) Capacity

Each lithium battery cell was charged and discharged according to the following conditions. First, each lithium battery cell was charged at 0.2 C to the cut-off condition of 4.2V/20 mA and discharged at 0.2 C to 2.75V. Second, each lithium battery cell was charged at 0.5 C to the cut-off condition of 4.2V/20 mA and discharged at 0.2 C to 2.75V. Third, the lithium battery cell was charged at 0.5 C on the cut-off condition of 4.2V/0.1 C and discharged at 0.5 C to 3V. The discharge capacity was measured at the third charge-discharge cycle.

2) Cycle-Life Characteristics

Each lithium battery cell was charged at 1 C to the cut-off condition of 4.2V/0.1 C and discharged at 1 C to 3V. Each battery cell was charged and discharged 300 times. The capacity after the 300th charge-discharge cycle was measured and its percentage of the capacity after the first cycle was recorded.

3) Measurement of Adherence Strength

Peel Strength (N/mm)

Each electrode was adhered to a separator to form a specimen having a width of 20 mm and a length of 100 mm. 10 mm of the separator was then peeled from the electrode. The peeled ends of the separator were gripped on the top and bottom and the separator was peeled in the opposite direction to measure the peel strength.

Shear Strength (N/mm)

A 1.5 cm×1.5 cm specimen in which the electrode and separator were attached was prepared. The specimen was gripped on the top and bottom and pulled in the opposite direction to measure shear strength.

4) Strength Evaluation

Strength at Normal Temperature

Each lithium battery cell was charged at 0.2 C to the cut-off condition of 4.2V, 20 mAh and discharged at 0.2 C to the cut-off voltage of 2.75V. Each cell was then charged under constant-current to the cut-off condition of 1 C/36 min. Each lithium battery cell was measured using the Universal Test Machine (Instron) by the 3 point bending mode. The Maximum Stress (N) when bending at the speed of 5 mm/min to 3 mm in the length direction was measured.

Strength After Placement at High Temperature—1

Each lithium battery cell was charged at 0.2 C to the cut-off condition of 4.2V, 20 mAh, and discharged at 0.2 C to the cut-off voltage of 2.75V. Then, each cell was charged at 0.5 C to the cut-off condition of 4.2V, 0.1 C and placed at 90° C. for 4 hours. Each cell was then placed at room temperature for more than 6 hours. The strength of the lithium battery cell after placement at 90° C. was measured by the same method used to measure the strength at room temperature.

Strength After Placement at High Temperature—2

Each lithium battery cell was charged at 0.2 C to the cut-off condition of 4.2V, 20 mAh, and discharged at 0.2 C to the cut-off voltage of 2.75V. Then, each cell was charged at 1 C to the cut-off condition of 4.2V, 20 mA, and placed at 80° C. for 120 hours and then placed at room temperature for more than 6 hours. The strength of the lithium battery cell after placement at 80° C. was measured by the same method used to measure the strength at room temperature.

The results of the above measurements are shown in Table 1 below.

TABLE 1

|  | Normal temperature strength (N) | High temperature strength-1 (N) | High temperature strength-2 (N) | Peel strength (N/mm) | Shear strength (N/mm) | Capacity (mAh) | Cycle-life (%) |
| --- | --- | --- | --- | --- | --- | --- | --- |
| Example 1 | 75 | 77 | 74 | 0.01 | 1.0 | 830 | 85 |
| Example 2 | 70 | 70 | 65 | 0.006 | 0.85 | 832 | 88 |
| Example 3 | 65 | 60 | 50 | 0.002 | 0.74 | 834 | 91 |
| Example 4 | 90 | 95 | 85 | 0.015 | 1.07 | 800 | 85 |
| Example 5 | 105 | 105 | 96 | 0.021 | 1.11 | 760 | — |
| Example 6 | 110 | 108 | 95 | 0.022 | 1.15 | 730 | — |
| Example 7 | 90 | 91 | 75 | 0.016 | 1.1 | 835 | 90 |
| Example 8 | 170 | 168 | 168 | 0.045 | 1.45 | 800 | 84 |
| Example 9 | 171 | 169 | 160 | 0.044 | 1.40 | 805 | 85 |

TABLE 1-continued

|  | Normal temperature strength (N) | High temperature strength-1 (N) | High temperature strength-2 (N) | Peel strength (N/mm) | Shear strength (N/mm) | Capacity (mAh) | Cycle-life (%) |
|---|---|---|---|---|---|---|---|
| Example 10 | 146 | 147 | 140 | 0.035 | 1.35 | 835 | 85 |
| Example 11 | 145 | 146 | 144 | 0.067 | 1.36 | 834 | 95 |
| Example 12 | 147 | 144 | 145 | 0.035 | 1.33 | 835 | 95 |
| Example 13 | 110 | 114 | 110 | 0.023 | 1.14 | 832 | 90 |
| Example 14 | 146 | 146 | 145 | 0.038 | 1.34 | 836 | 94 |
| Example 15 | 145 | 143 | 142 | 0.035 | 1.29 | 834 | 94 |
| Example 16 | 120 | 110 | 105 | 0.020 | 1.10 | 829 | 84 |
| Example 17 | 146 | 145 | 140 | 0.036 | 1.35 | 835 | 95 |
| Example 18 | 147 | 146 | 146 | 0.037 | 1.37 | 834 | 96 |
| Comp. Example 1 | 45 | 40 | — | 0.005 | — | 830 | 92 |

As shown in Table 1, the lithium battery cells according to Examples 1 through 18 were 1.4 to 4.3 times stronger after storage at room temperature and high temperatures than the cell of Comparative Example 1. Also, the peel strength of each of Examples 1 through 18 were significantly higher than Comparative Example 1. The shear strength of each of Examples 1 through 18 were also remarkably high, whereas that of Comparative Example 1 was so low it could not be measured.

The physical strength of the lithium battery cells of Examples 1 through 18 were excellent compared to the cell of Comparative Example 1, and the capacity and cycle-life characteristics of Examples 1 through 18 were comparable to that of Comparative Example 1.

The lithium secondary batteries of the present invention have comparable battery performance characteristics to lithium secondary batteries employing conventional non-aqueous electrolytes. However, the lithium batteries according to the present invention have significantly improved strength characteristics at room and high temperatures.

While the present invention has been described with reference to certain exemplary embodiments, those skilled in the art will appreciate that various modifications and substitutions can be made to the described embodiments without departing from the spirit and scope of the present invention as set forth in the appended claims.

What is claimed is:

1. A lithium secondary battery comprising;
   a positive electrode comprising a positive active material capable of intercalating and deintercalating lithium ions;
   a negative electrode comprising a negative active material capable of intercalating and deintercalating lithium ions; and
   a polymer electrolyte comprising a polymer, a non-aqueous organic solvent, and a lithium salt, the polymer electrolyte having a shear strength relative to the positive electrode of about 0.7 N/mm or greater, the polymer comprising:
      a first monomer represented by a polyesterpolyol of Formula 1:

A-polyesterpolyol-B  (1)

wherein the polyesterpolyol is produced by condensation of at least one alcohol derivative having from 2 to 6 OH groups and at least one dicarboxylic acid derivative, the polyesterpolyol having a weight average molecular weight ranging from about 100 to about 10,000,000, and each of A and B are linked to terminal OH groups of the polyesterpolyol, each of A and B being selected from the group consisting of $CH_2=CR-C(=O)-$, $CH_2=CR-C-CH_2-$, $CH_2=CR-$, $CH_2=CR-O-C(=O)-$, $CH_2=CH-CH_2-O-$, $CH_2=CH-S(=O)_2-$, or $CH_2=CR-C(=O)-O-CH_2CH_2-NH-C(=O)-$, wherein R is selected from the group consisting of $C_1$ to $C_{10}$ hydrocarbons and $C_6$ to $C_{10}$ aromatic hydrocarbons; and
      a second monomer selected from the group consisting of ethylene glycol methylether acrylate, Formulas 2 through 7, and combinations thereof:

$$CH_2=CR1-C(=O)-O-X \quad (2)$$

$$CH_2=CR1-O-X \quad (3)$$

$$CH_2=CR1-O-C(=O)-X \quad (4)$$

$$CH_2=CH-CH_2-O-X \quad (5)$$

$$CH_2=CH-S(=O)_2-X \quad (6)$$

$$CH_2=CR1-C(=O)-O-CH_2CH_2-NH-C(=O)-O-X \quad (7)$$

wherein R1 is selected from the group consisting of H, $C_1$ to $C_{10}$ hydrocarbons and $C_1$ to $C_{10}$ aromatic hydrocarbons, and X is selected from the group consisting of $C_1$ to $C_{20}$ hydrocarbons, $C_1$ to $C_{20}$ halogenated hydrocarbons, $C_1$ to $C_{20}$ aromatic hydrocarbons and $C_1$ to $C_{20}$ halogenated aromatic hydrocarbons.

2. The lithium secondary battery of claim 1, wherein the polymer electrolyte has a shear strength relative to the positive electrode ranging from about 0.7 to about 1.5 N/mm.

3. The lithium secondary battery of claim 2, wherein the polymer electrolyte has a shear strength relative to the positive electrode ranging from about 1.0 to about 1.5 N/mm.

4. The lithium secondary battery of claim 3, wherein the polymer electrolyte has a shear strength relative to the positive electrode ranging from about 1.2 to about 1.5 N/mm.

5. The lithium secondary battery of claim 1, wherein the at least one alcohol derivative is selected from the group consisting of polyethylene glycol, polypropylene glycol, alkanediol, ethoxylated alkanediol, propoxylated alkanediol, trimethylolpropane, ethoxylated trimethylolpropane, propoxylated trimethylolpropane, ditrimethylolpropane, ethoxylated ditrimethylolpropane, propoxylated ditrimethylolpropane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A, propoxylated bisphenol A, and combinations thereof.

6. The lithium secondary battery of claim 5, wherein each of A and B is selected from the group consisting of (meth) acryl groups, vinyl groups, allyl groups, vinylsulfonyl groups, urethane(meth)acryl groups, and combinations thereof.

7. The lithium secondary battery of claim 1, wherein the second monomer is selected from the group consisting of monomers represented by Formulas 3, 6 and 7.

8. The lithium secondary battery of claim 1, wherein the lithium salt is selected from the group consisting of $LiPF_6$, $LiBF_4$, lithium bis(oxalato) borate, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2y+1}SO_2)$ wherein x and y are natural numbers, $LiSO_3CF_3$, and combinations thereof.

9. The lithium secondary battery of claim 1, wherein the non-aqueous organic solvent is selected from the group consisting of carbonates, esters, ethers, ketones, nitriles, and combinations thereof.

10. The lithium secondary battery of claim 1, wherein the non-aqueous organic solvent comprises a carbonate-based solvent and an aromatic hydrocarbon-based organic solvent.

11. The lithium secondary battery of claim 10, wherein the aromatic hydrocarbon-based organic solvent is selected from the group consisting of aromatic compounds represented by Formula 9:

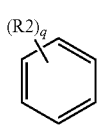

(9)

wherein R2 is selected from the group consisting of halogens, $C_1$ to $C_{10}$ alkyls and combinations thereof, and q is an integer ranging from 0 to 6.

12. The lithium secondary battery of claim 11, wherein the aromatic hydrocarbon-based organic solvent is selected from the group consisting of benzene, fluorobenzene, toluene, fluorotoluene, trifluorotoluene, xyl ene, and combinations thereof.

13. The lithium secondary battery of claim 1, wherein the polymer electrolyte further comprises a carbonate additive selected from the group consisting of vinylene carbonate, divinylsulfone, ethylene sulfite, carbonates having substituents selected from the group consisting of halogens, cyano (CN) groups, nitro ($NO_2$) groups and combinations thereof.

14. The lithium secondary battery of claim 13, wherein the carbonate additive is selected from the group consisting of carbonates having substituents selected from the group consisting of halogens, cyano (CN) groups and nitro ($NO_2$) groups.

15. The lithium secondary battery of claim 14, wherein the carbonate additive is selected from the group consisting of compounds represented by Formula 10:

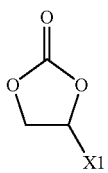

(10)

wherein X1 is selected from the group consisting of halogens, cyano (CN) groups and nitro ($NO_2$) groups.

16. The lithium secondary battery of claim 15, wherein the carbonate additive is fluoroethylene carbonate.

17. A lithium secondary battery comprising:
a positive electrode comprising a positive active material capable of intercalating and deintercalating lithium ions;
a negative electrode including a negative active material capable of intercalating and deintercalating lithium ions; and
a polymer electrolyte including a polymer, a non-aqueous organic solvent, and a lithium salt, the polymer electrolyte having a shear strength relative to the positive electrode of about 0.7 N/mm or greater and a peel strength relative to the positive electrode of about 0.002 N/mm or greater, the polymer comprising:
a first monomer represented by a polyesterpolyol of Formula 1:

A-polyesterpolyol-B          (1)

wherein the polyesterpolyol is produced by condensation of at least one alcohol derivative having from 2 to 6 OH groups and at least one dicarboxylic acid derivative, the polyesterpolyol having a weight average molecular weight ranging from about 100 to about 10,000,000, and each of A and B are linked to terminal OH groups of the polyesterpolyol, each of A and B being selected from the group consisting of $CH_2$=CR—C(=O)—, $CH_2$=CR—C—$CH_2$—, $CH_2$=CR—, $CH_2$=CR—O—C(=O)—, $CH_2$=CH—$CH_2$—O—, $CH_2$=CH—S(=O)$_2$—, or $CH_2$=CR—C(=)—O—$CH_2CH_2$—NH—C(=O)—, wherein R is selected from the group consisting of $C_1$ to $C_{10}$ hydrocarbons and $C_6$ to $C_{10}$ aromatic hydrocarbons; and
a second monomer selected from the group consisting of ethylene glycol methylether acrylate, Formulas 2 through 7, and combinations thereof:

$CH_2$=CR1-C(=O)—O—X          (2)

$CH_2$=CR1-O—X          (3)

$CH_2$=CR1-O—C(=O)—X          (4)

$CH_2$=CH—$CH_2$—O—X          (5)

$CH_2$=CH—S(=O)$_2$—X          (6)

$CH_2$=CR1-C(=O)—O—$CH_2$NH—C(=O)—O—X          (7)

wherein R1 is selected from the group consisting of H, $C_1$ to $C_{10}$ hydrocarbons and $C_1$ to $C_{10}$ aromatic hydrocarbons, and X is selected from the group consisting of $C_1$ to $C_{20}$ hydrocarbons, $C_1$ to 020 halogenated hydrocarbons, $C_1$ to $C_{10}$ aromatic hydrocarbons and $C_1$ to $C_{10}$ halogenated aromatic hydrocarbons.

18. The lithium secondary battery of claim 17, wherein the polymer electrolyte has a shear strength relative to the positive electrode ranging from about 0.7 to about 1.5 N/mm and a peel strength relative to the positive electrode ranging from about 0.002 to about 0.07 N/mm.

19. The lithium secondary battery of claim 18, wherein the polymer electrolyte has a shear strength relative to the positive electrode ranging from about 1.0 to about 0.5 N/mm and a peel strength relative to the positive electrode ranging from about 0.015 to about 0.07 N/mm.

20. The lithium secondary battery of claim 19, wherein the polymer electrolyte has a shear strength relative to the positive electrode ranging from about 1.2 to about 1.5 N/mm and a peel strength relative to the positive electrode ranging from about 0.035 to 0.07 N/mm.

21. The lithium secondary battery of claim 17, wherein the at least one alcohol derivative is selected from the group consisting of polyethylene glycol, polypropylene glycol, alkanediol, ethoxylated alkanediol, propoxylated alkanediol, trimethylolpropane, ethoxylated trimethylolpropane, propoxylated trimethylolpropane, ditrimethylolpropane, ethoxylated ditrimethylolpropane, propoxylated ditrimethylolpropane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A, propoxylated bisphenol A, and combinations thereof.

22. The lithium secondary battery of claim 1, wherein each of A and B is selected from the group consisting of (meth)acryl groups, vinyl groups, allyl groups, vinylsulfonyl groups, urethane(meth)acryl groups, and combinations thereof.

23. The lithium secondary battery of claim 17, wherein the second monomer is selected from the group consisting of monomers represented by Formulas 3, 6 and 7.

24. The lithium secondary battery of claim 17, wherein the lithium salt is selected from the group consisting of $LiPF_6$, $LiBF_4$, lithium bis(oxalato) borate, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2y+1}SO_2)$ wherein x and y are natural numbers, and $LiSO_3CF_3$.

25. The lithium secondary battery of claim 17, wherein the non-aqueous organic solvent is selected from the group consisting of carbonates, esters, ethers, ketones, nitriles, and combinations thereof.

26. The lithium secondary battery of claim 17, wherein the non-aqueous organic solvent comprises a carbonate-based solvent and an aromatic hydrocarbon-based organic solvent.

27. The lithium secondary battery of claim 26, wherein the aromatic hydrocarbon-based organic solvent is selected from the group consisting of aromatic compounds represented by Formula 9:

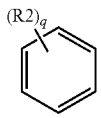

(9)

wherein R2 is selected from the group consisting of halogens, $C_1$ to $C_{10}$ alkyls, and combinations thereof, and q is an integer ranging from 0 to 6.

28. The lithium secondary battery of claim 27, wherein the aromatic hydrocarbon-based organic solvent is selected from the group consisting of benzene, fluorobenzene, toluene, fluorotoluene, trifluorotoluene, xylene, and combinations thereof.

29. The lithium secondary battery of claim 17, wherein the electrolyte further comprises a carbonate additive selected from the group consisting of vinylene carbonate, divinylsulfone, ethylene sulfite, carbonates having substituents selected from the group consisting of halogens, cyano (CN) groups and nitro ($NO_2$) groups, and combinations thereof.

30. The lithium secondary battery of claim 29, wherein the carbonate additive is selected from the group consisting of compounds represented by Formula 10:

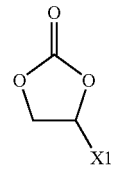

(10)

wherein X1 is selected from the group consisting of halogens, cyano (CN) groups, and nitro ($NO_2$) groups.

31. The lithium secondary battery of claim 30, wherein the carbonate additive is fluoroethylene carbonate.

32. The lithium secondary battery of claim 17, wherein the negative active material is a carbon-based material.

33. The lithium secondary battery of claim 17, wherein the positive active material is a lithiated intercalation compound.

34. A lithium secondary battery comprising:
a positive electrode comprising a positive active material capable of intercalating and deintercalating lithium ions;
a negative electrode comprising a negative active material capable of intercalating and deintercalating lithium ions; and
a polymer electrolyte comprising a polymer, a non-aqueous organic solvent, and a lithium salt, the polymer comprising:
a first monomer represented by a polyesterpolyol of Formula 1:

A-polyesterpolyol-B (1)

wherein the polyesterpolyol is produced by condensation of at least one alcohol derivative having from 2 to 6 OH groups and at least one dicarboxylic acid derivative, the polyesterpolyol having a weight average molecular weight ranging from about 100 to about 10,000,000, and each of A and B are linked to terminal OH groups of the polyesterpolyol, each of A and B being selected from the group consisting of $CH_2$=CR—C(=O)—, $CH_2$=CR—C—$CH_2$—, $CH_2$=CR—, $CH_2$=CR—O—C(O)—, $CH_2$=CH—$CH_2$—O—, $CH_2CH$—S(O)$_2$—, or $CH_2$=CR—C(=O)—O—$CH_2CH_2$—NH—C(=O)—, wherein R is selected from the group consisting of Cj to $C_{10}$ hydrocarbons and $C_6$ to $C_{10}$ aromatic hydrocarbons; and
a second monomer selected from the group consisting ethylene glycol methylether acrylate, Formulas 2 through 7, and combinations thereof:

$CH_2$=CR1-C(=O)—O—X (2)

$CH_2$=CR1-O—X (3)

$CH_2$=CR1-O—C(=O)—X (4)

$CH_2$=CH—$CH_2$—O—X (5)

$CH_2$=CH—S(=O)$_2$—X (6)

$CH_2$=CR1-C(=O)—O—$CH_2CH_2$—NH—C(=O)—O—X (7)

wherein R1 is selected from the group consisting of H, $C_1$ to $C_{10}$ hydrocarbons and $C_1$ to $C_{10}$ aromatic hydrocarbons, and X is selected from the group consisting of $C_1$ to $C_{20}$ hydrocarbons, $C_1$ to $C_{20}$ halogenated hydrocarbons, $C_1$ to $C_{20}$ aromatic hydrocarbons and $C_1$ to $C_{20}$ halogenated aromatic hydrocarbons.

* * * * *

UNITED STATES PATENT AND TRADEMARK OFFICE
CERTIFICATE OF CORRECTION

PATENT NO. : 7,745,053 B2  Page 1 of 1
APPLICATION NO. : 11/406773
DATED : June 29, 2010
INVENTOR(S) : Yong-Beom Lee et al.

It is certified that error appears in the above-identified patent and that said Letters Patent is hereby corrected as shown below:

In the Claims

Column 15, Claim 12, line 41     Delete "xyl ene"
Insert -- xylene --

Column 16, Claim 17, line 54     Delete "020"
Insert -- $C_{20}$ --

Column 16, Claim 17, line 55     Delete "$C_{10}$"
Insert -- $C_{20}$ --

Column 16, Claim 17, line 56     Delete "$C_{10}$"
Insert -- $C_{20}$ --

Column 16, Claim 19, line 65     Delete "0.5 N/mm"
Insert -- 1.5 N/mm --

Column 17, Claim 22, line 18     Delete "claim 1,"
Insert -- claim 17, --

Column 18, Claim 34, line 41     Delete "$C_j$"
Insert -- $C_l$ --

Signed and Sealed this
Seventeenth Day of January, 2012

David J. Kappos
*Director of the United States Patent and Trademark Office*